US008163076B2

(12) United States Patent
Oyanagi et al.

(10) Patent No.: US 8,163,076 B2
(45) Date of Patent: Apr. 24, 2012

(54) INK JET RECORDING METHOD, RECORDED PRODUCT, INK COMPOSITION FOR INK JET RECORDING, INK SET, INK CARTRIDGE, AND INK JET RECORDING APPARATUS

(75) Inventors: Takashi Oyanagi, Matsumoto (JP); Hiroki Nakane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 12/683,525

(22) Filed: Jan. 7, 2010

(65) Prior Publication Data
US 2010/0178474 A1 Jul. 15, 2010

(30) Foreign Application Priority Data

Jan. 9, 2009 (JP) .................. 2009-003286

(51) Int. Cl.
C09D 11/02 (2006.01)
(52) U.S. Cl. ...................... 106/31.6; 347/100
(58) Field of Classification Search .............. 106/31.6; 347/100
See application file for complete search history.

(56) References Cited

U.S. PATENT DOCUMENTS

| 5,672,200 | A | * | 9/1997 | Heinz et al. .................. 106/403 |
| 6,203,899 | B1 | * | 3/2001 | Hirose et al. ............... 428/32.25 |
| 7,303,619 | B2 | | 12/2007 | Oyanagi |
| 2008/0213518 | A1 | | 9/2008 | Oyanagi et al. |

FOREIGN PATENT DOCUMENTS

| EP | 1942157 | A2 | * | 7/2008 |
| JP | 2000-303011 | A | | 10/2000 |
| JP | 2001-310937 | A | | 6/2001 |
| JP | 2001-220526 | A | | 8/2001 |
| JP | 2003-089260 | A | | 3/2003 |
| JP | 2003-341217 | A | | 12/2003 |
| JP | 2005-036079 | A | | 2/2005 |
| JP | 2005-068250 | A | | 3/2005 |
| JP | 2005-068251 | A | | 3/2005 |
| JP | 2008-239951 | A | | 10/2008 |

OTHER PUBLICATIONS

English Abstract of Japanese Application No. 2000-303011A Published Oct. 31, 2000.
English Abstract of Japanese Application No. 2001-220526 A Published Aug. 14, 2001.
English Abstract of Japanese Application No. 2001-310937 A Published Jun. 11, 2001.
English Abstract of Japanese Application No. 2003-089260 A Published Mar. 25, 2003.
English Abstract of Japanese Application No. 2003-341217 A Published Dec. 3, 2003.
English Abstract of Japanese Application No. 2005-036079 A Published Feb. 10, 2005.

(Continued)

Primary Examiner — Jerry Lorengo
Assistant Examiner — Veronica F Faison
(74) Attorney, Agent, or Firm — Ladas & Parry LLP

(57) ABSTRACT

An ink-jet recording method includes ejecting a droplet of an ink composition containing a metal pigment and optically transparent spherical particles with an ink-jet recording apparatus, the ink composition having an optically transparent spherical particle content of 0.5% to 5% by mass, and attaching the droplet to a recording surface of a recording medium having an average surface roughness Ra of 3 μm or more, thereby recording an image.

21 Claims, 1 Drawing Sheet

OTHER PUBLICATIONS

English Abstract of Japanese Application No. 2005-068250 A Published Mar. 17, 2005.
English Abstract of Japanese Application No. 2005-068251 A Published Mar. 17, 2005.
English Abstract of Japanese Application No. 2008-239951 A Published Oct. 10, 2008.

* cited by examiner

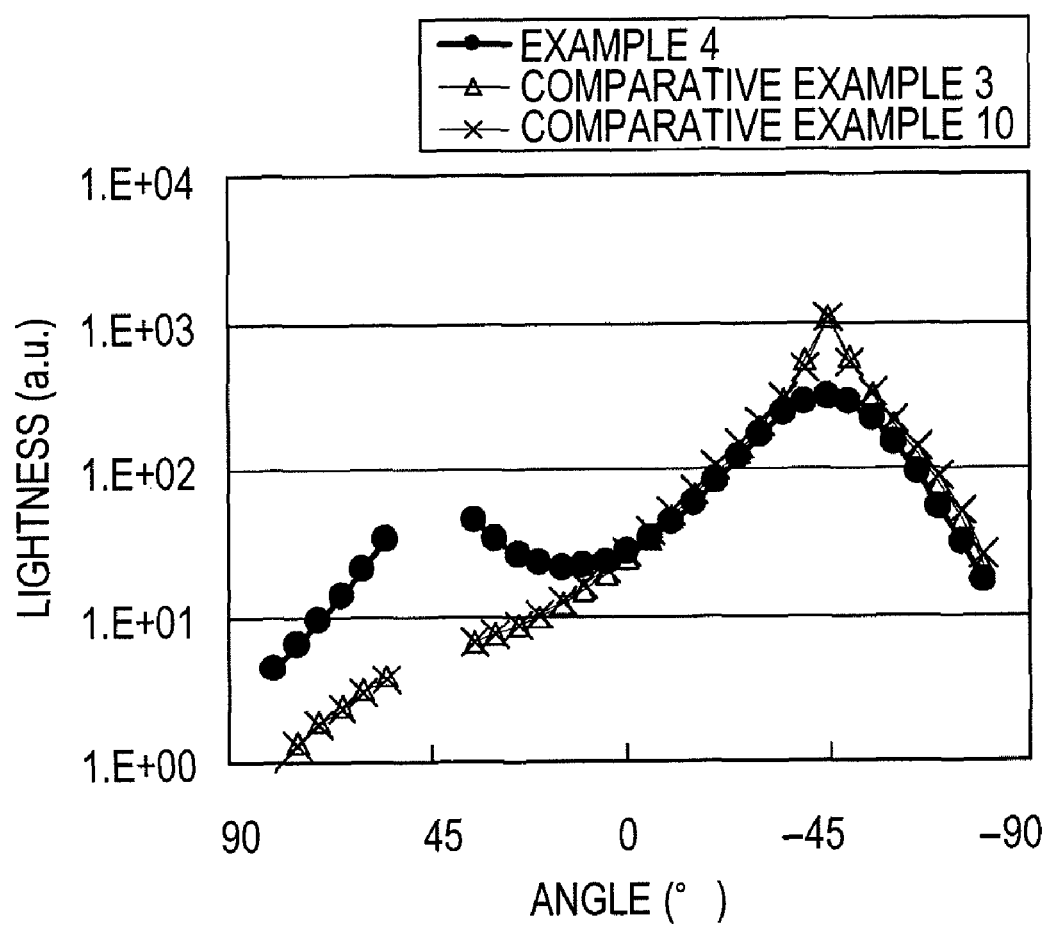

INK JET RECORDING METHOD, RECORDED PRODUCT, INK COMPOSITION FOR INK JET RECORDING, INK SET, INK CARTRIDGE, AND INK JET RECORDING APPARATUS

BACKGROUND

1. Technical Field

The present invention relates to an ink-jet recording method, a recorded product, an ink composition for ink-jet recording, an ink set, an ink cartridge, and an ink-jet recording apparatus.

2. Related Art

Hitherto, recorded products having retroreflectivity (retroreflector) have been used for, for example, traffic signs, traffic-safety goods, markings on roads (e.g., crosswalks and center lines), escape-route indicators. In the case where retroreflectivity is imparted to a recorded product, the recorded product has high visibility even under dark environments, e.g., at night and inside a tunnel.

The retroreflectivity of the exemplified recorded products is provided by the fact that the recorded products have layered structures. A typical example of the layered structure of a recorded product having retroreflectivity is a structure in which a reflective layer is arranged on a recording medium and a retroreflective layer that imparts retroreflectivity is arranged on the reflective layer. In such a case, there are different structures of the retroreflective layer for different purposes. Examples of the structures of the retroreflective layer include an open-type structure in which bare glass beads or the like are arranged, a close-type structure in which coated glass beads or the like are arranged, and an encapsulated-lens-type structure in which glass beads or the like are covered with a film.

In the case of producing such a recorded product having retroreflectivity, the production process has been often complicated in order to form the structure. Furthermore, a special step has been required depending on the structure, in some cases. To solve the problems, for example, JP-A-2000-303011 discloses a retroreflective printing ink composition containing glass beads, mica, and an adhesive resin and a retroreflective product. The patent document describes that the retroreflective product is efficiently produced by screen printing, gravure printing, coating, or the like.

Meanwhile, there is an ink-jet recording method as a highly efficient method for forming a recorded product. The ink-jet recording method is a method including flying droplets of an ink composition and attaching the droplets to a recording medium, such as paper. This recording method is characterized in that high-resolution, high-quality images can be recorded on various recording media.

JP-A-2000-303011 is an example of the related art.

However, it is very difficult to use the known retroreflective printing ink composition as exemplified above in the ink-jet recording method. One reason for this is that since the ink-jet recording method includes a step of ejecting the ink composition from a nozzle, the size of a solid component in the ink composition is limited to the size of the nozzle.

SUMMARY

An advantage of some aspects of the invention is that it provides an ink-jet recording method for forming an image with retroreflectivity and a recorded product obtained by the recording method.

An advantage of some aspects of the invention is that it provides an ink composition that forms an image with retroreflectivity and is suitable for the ink-jet recording method.

According to a first aspect of the invention, an ink-jet recording method includes ejecting a droplet of an ink composition containing a metal pigment and optically transparent spherical particles with an ink-jet recording apparatus, the ink composition having an optically transparent spherical particle content of 0.5% to 5% by mass, and attaching the droplet to a recording surface of a recording medium having an average surface roughness Ra of 3 μm or more, thereby recording an image.

It is thus possible to easily form the image with retroreflectivity on the recording medium.

In the method according to the first aspect of the invention, the spherical particles preferably have an average diameter of 1 to 3 μm.

In the method according to the first aspect of the invention, it is preferable that the ink composition further contain an organic solvent.

In the method according to the first aspect of the invention, it is preferable that the mass ratio of the metal pigment to the spherical particles contained in the ink composition be in the range of 3:1 to 1:10.

In the method according to the first aspect of the invention, it is preferable that the ink composition further contain a colorant.

In the method according to the first aspect of the invention, it is preferable that the metal pigment be composed of aluminum or an aluminum alloy.

In the method according to the first aspect of the invention, the metal pigment is preferably formed of plate-like particles. A 50%-average particle diameter R50 in terms of circle-equivalent diameters determined from areas of X-Y planes of the plate-like particles is preferably in the range of 0.5 to 3 μm. R50/Z>5 is satisfied, where X represents a major axis on a plane of each of the plate-like particles, Y represents a minor axis on the plane, and Z represents the thickness of the plate-like particles.

In the method according to the first aspect of the invention, it is preferable that the ink composition have a metal pigment content of 0.5% to 3% by mass.

According to a second aspect of the invention, a recorded product includes the image on the recording medium recorded by the ink-jet recording method according to the first aspect of the invention.

The recorded product includes the image having retroreflectivity.

In the recorded product according to the second aspect of the invention, the image preferably has a retroreflective index Rr of 1.5% or more. The retroreflective index Rr is expressed as expression (1).

$$Rr = Yr/Ys \quad (1)$$

where Yr and Ys represent the lightnesses of a retroreflective component and a regular reflection component, respectively, of reflected light when light is incident on the image at an incident angle of 45°.

According to a third aspect of the invention, an ink composition for use in ink-jet recording, the ink composition being used to record an image by ink-jet recording on a recording medium having an average surface roughness Ra of 3 μm or more, includes a metal pigment and optically transparent spherical particles. The metal pigment is formed of plate-like particles. A 50%-average particle diameter R50 in terms of circle-equivalent diameters determined from areas of the X-Y planes of the plate-like particles is in the range of 0.5 to 3 μm. R50/Z>5 is satisfied, where X represents a major axis on a plane of each of the plate-like particles, Y represents a minor axis on the plane, and Z represents the thickness of the plate-like particles. The ink composition for use in ink-jet recording has a spherical particle content of 0.5% to 5% by mass. The spherical particles have an average diameter of 1 to 3 μm.

Such an ink composition for use in ink-jet recording provides the image having retroreflectivity and is suitable for an ink-jet recording method.

In the ink composition for use in ink-jet recording according to the third aspect of the invention, it is preferable that the mass ratio of the metal pigment to the spherical particles contained be in the range of 3:1 to 1:10.

The ink composition for use in ink-jet recording according to the third aspect of the invention may further contain an organic solvent.

The ink composition for use in ink-jet recording according to the third aspect of the invention may further contain a colorant.

In the ink composition for use in ink-jet recording according to the third aspect of the invention, it is preferable that the metal pigment be composed of aluminum or an aluminum alloy.

In the ink composition for use in ink-jet recording according to the third aspect of the invention, it is preferable that the ink composition have a metal pigment content of 0.5% to 3% by mass.

In the ink composition for use in ink-jet recording according to the third aspect of the invention, it is preferable that the ink composition have a viscosity of 2 to 15 mPa·s at 20° C.

According to a fourth aspect of the invention, an ink set includes the ink composition according to the third aspect of the invention.

According to a fifth aspect of the invention, an ink cartridge includes the ink set according to the fourth aspect of the invention.

According to a sixth aspect of the invention, an ink-jet recording apparatus includes the ink composition according to the third aspect of the invention, the ink set according to the fourth aspect of the invention, or the ink cartridge according to the fifth aspect of the invention.

BRIEF DESCRIPTION OF THE DRAWING

The invention will be described with reference to the accompanying drawing, wherein like numbers reference like elements.

FIGURE is a graph showing exemplary reflectivity measurement in example and comparative examples.

DESCRIPTION OF EXEMPLARY EMBODIMENTS

Preferred embodiments of the invention will be described in detail below.

1. INK JET RECORDING METHOD

An ink-jet recording method according to this embodiment includes ejecting an droplet of an ink composition and attaching the droplet to a recording medium to record an image with an ink-jet recording apparatus.
1.1. Ink-Jet Recording Apparatus The ink-jet recording apparatus used in the recording method according to this embodiment is not particularly limited as long as it can eject droplets of an ink composition and attach the droplets to an recording medium to record information.

Examples of the recording method employed in the ink-jet recording apparatus include an electrostatic attraction method; piezoelectric methods; and a thermal jet method. The electrostatic attraction method includes applying a strong electric field between a nozzle and accelerating electrodes arranged at the front of the nozzle, continuously ejecting ink droplets from the nozzle, and applying a print information signal while the ink droplets are flying between deflection electrodes. Alternatively, the electrostatic attraction method includes ejecting ink droplets in response to a print information signal without deflecting the ink droplets. The piezoelectric methods include a method including applying a pressure to an ink liquid with a small pump, mechanically vibrating a nozzle with, for example, a crystal resonator, and forcedly ejecting ink droplets; and a method including simultaneously applying a pressure and a print information signal to an ink liquid with a piezoelectric element and ejecting ink droplets to perform recording. The thermal jet method includes heating and foaming an ink liquid with a microelectrode in response to a print information signal and ejecting ink droplets to perform recording.
1.2. Ink Composition The ink composition (ink composition for use in ink-jet recording) used in the ink-jet recording method according to this embodiment contains at least a metal pigment and spherical particles.
1.2.1. Metal Pigment Any metal pigment may be used as the metal pigment contained in the ink composition as long as the foregoing ink-jet recording apparatus can eject droplets of the ink composition. The metal pigment has the function of reflecting light when the ink composition is deposited on a recording medium. Furthermore, the metal pigment has the function of imparting a metallic luster to the deposited ink. In the case where a configuration of providing the deposit having retroreflectivity has functions classified into the function of reflecting light, the function of refracting light, and the function of protecting a structure, the metal pigment mainly has the function of reflecting light.

Examples of the metal pigment include particles composed of aluminum, silver, gold, platinum, nickel, chromium, tin, zinc, indium, titanium, and copper. Al least one selected from these elemental metals, alloys thereof, and mixtures thereof may be used. The metal pigment used in this embodiment is preferably composed of aluminum or an aluminum alloy from the viewpoint of its light-reflecting ability and cost. In the case of using an aluminum alloy, an additional metal element or a nonmetallic element that can be added to aluminum is not particularly limited as long as it has a metallic luster. Examples thereof include silver, gold, platinum, nickel, chromium, tin, zinc, indium, titanium, and copper. At least one selected from these elements may be preferably used.

The metal pigment has a size such the ink-jet recording apparatus can eject droplets of the ink composition. In the case where each of the particles of the metal pigment is approximated by a sphere, the metal pigment may have an average particle size (diameter) of, for example, 0.5 to 10 μm and preferably 0.5 to 5 μm.

The ink composition preferably has a metal pigment content of 0.1% to 5% by mass, more preferably 0.25% to 4% by mass, still more preferably 0.5% to 3% by mass, and particularly preferably 0.5% to 2% by mass with respect to the total mass of the ink composition.

More preferably, the metal pigment is formed of plate-like particles. The use of the metal pigment further enhances the light-reflecting function of a deposit formed on a recording medium. Furthermore, the use of the metal pigment results in a reduction in the metal pigment content of the ink composition needed to provide the light-reflecting function, thereby further reducing the viscosity of the ink composition, so that the ink composition can be more easily used in the ink-jet recording method.

Here, the term "plate-like particles" is used to indicate particles each having a substantially flat plane (X-Y plane) and a substantially uniform thickness. A metal pigment produced by crushing a metal film formed by evaporation is formed of particles each having a substantially flat plane and a substantially uniform thickness. Thus, the major axis on the plane of each plate-like particle is defined as X, the minor axis is defined as Y, and the thickness of the particle is defined as Z.

In the case of using the metal pigment formed of the plate-like particles, preferably, a 50%-average particle diameter, R50, in terms of circle-equivalent diameters determined from areas of the X-Y planes of the plate-like particles is in the range of 0.5 to 3 μm, and R50/Z>5 is satisfied, wherein X represents the major axis on the plane of each plate-like particle, Y represents the minor axis, and Z represents the thickness. More preferably, the 50%-average particle diameter R50 is in the range of 0.75 to 2 μm. A 50%-average particle diameter R50 of less than 0.5 μm can lead to an insufficient light-reflecting function. A 50%-average particle diameter R50 exceeding 3 μm can cause a reduction in print stability in ink-jet recording. Regarding the relationship between the 50%-average particle diameter R50 in terms of the circle-equivalent diameters and the thickness Z, R50/Z>5 is preferably satisfied. When R50/Z>5 is satisfied, it is possible to form a metal layer having a high hiding power. An R50/Z of 5 or less can cause a reduction in print stability in ink-jet recording.

The maximum particle diameter, Rmax, in terms of the circle-equivalent diameters determined from the areas of the X-Y planes of the plate-like particles is preferably 10 μm or less from the viewpoint of preventing clogging of the ink-jet recording apparatus with the ink composition. An Rmax of 10 μm or less can prevent clogging of a nozzle and a filter configured to remove foreign matter arranged in an ink-flow passage of the ink-jet recording apparatus.

Here, the term "circle-equivalent diameter" is used to indicate the diameter of a circle when the substantially flat plane (X-Y plane) of each of the plate-like particles is assumed to be the circle having the same projected area as the projected area of each plate-like particle. For example, in the case where the substantially flat plane (X-Y plane) of each plate-like particle has a polygonal shape, the diameter of a circle obtained by converting the projected shape of the polygon into the circle is referred to as the circle-equivalent diameter.

The 50%-average particle diameter R50 in terms of the circle-equivalent diameters of the plate-like particles is used to indicate a circle-equivalent diameter corresponding to 50% of the total number of measured particles when a frequency distribution of the number of particles for the circle-equivalent diameter is depicted.

The major axis X, the minor axis Y, and the circle-equivalent diameter on the plane of each plate-like particle can be measured with, for example, a particle-image analyzer. Examples of the particle-image analyzer that can be used include flow particle image analyzers FPIA-2100, FPIA-3000, and FPIA-3000S manufactured by Sysmex Corporation.

The metal pigment formed of the plate-like particles can be produced by, for example, forming a pigment composite having a structure in which a releasing resin layer and a layer composed of a metal or a metal compound are stacked, in that order, on a surface of a base sheet, detaching the layer composed of the metal or metal compound from the resin layer, and pulverizing the detached layer into fine plate-like particles.

The layer composed of the metal or metal compound is preferably formed by vacuum evaporation, ion plating, or sputtering. The layer composed of the metal or metal compound preferably has a thickness of 20 nm to 100 nm, thereby providing a pigment having an average thickness of 20 nm to 100 nm. A thickness of 20 nm or more results in an increase in performance (e.g., reflectivity and glossiness). A thickness of 100 nm or less results in the suppression of an increase in apparent specific gravity, thereby increasing the dispersion stability of the metal pigment in the ink composition.

The releasing resin layer of the pigment composite serves as an undercoat layer for the layer composed of the metal or metal compound and improves the releasability of the layer composed of the metal or metal compound from the base sheet. Preferred examples of a resin constituting the releasing resin layer include polyvinyl alcohol, polyvinyl butyral, polyethylene glycol, polyacrylic acid, polyacrylamide, cellulose derivatives, polyvinyl butyral, acrylic acid polymers, and modified nylon resins.

A solution of at least one resin constituting the releasing resin layer is applied to the base sheet and then dried to form the releasing resin layer. An additive such as a viscosity-adjusting agent may be added before the application. The releasing resin layer may be formed by a common technique, for example, gravure coating, roll coating, blade coating, extrusion coating, dip coating, or spin coating. After the application and drying, surface smoothing can be performed by calendering, if needed.

The thickness of the releasing resin layer is, but not particularly limited to, preferably 0.5 to 50 μm and more preferably 1 to 10 μm. A thickness of less than 0.5 μm results in an insufficient amount of the resin constituting the releasing resin layer. A thickness exceeding 50 μm can cause the detachment of the pigment layer from the releasing resin layer when the pigment composite is rolled.

Non-limiting examples of the base sheet include releasable films, such as polyester films composed of, for example, polytetrafluoroethylene, polyethylene, polypropylene, and polyethylene terephthalate, polyamide films composed of, for example, nylon 6.6 and nylon 6, polycarbonate films, triacetate films, and polyimide films. Among these, films composed of polyethylene terephthalate and copolymers thereof are preferred.

The thickness of the base sheet is, but not particularly limited to, preferably 10 to 150 μm. A thickness of 10 μm or more results in good handling properties in a process and the like. A thickness of 150 μm or less results in good flexibility, so that there is no problem with rolling, detachment, or the like.

Furthermore, the layer composed of the metal or metal compound may be sandwiched by protective layers as exemplified in JP-A-2005-68250. Examples of the protective layers include silicon oxide layers and protective resin layers.

The silicon oxide layers are not particularly limited as long as the layers contain silicon oxide. Preferably, the silicon oxide layers are formed by a sol-gel method with a silicon alkoxide or its polymer. An alcoholic solution containing a silicon alkoxide or its polymer is applied and firing to form the silicon oxide layers.

The protective resin layers are not particularly limited as long as a resin constituting the layers is not dissolved in a dispersion medium. Examples of the resin include polyvinyl alcohol, polyethylene glycol, polyacrylic acid, polyacrylamide, and cellulose derivatives. Among these, polyvinyl alcohol and cellulose derivatives are preferred.

An aqueous solution of at least one resin used for the protective resin layers is applied and dried to form the protective resin layers. The coating solution may further contain an additive such as a viscosity-adjusting agent. The solution containing silicon oxide or the solution containing the resin is applied in the same way as for the solution containing the resin constituting the releasing resin layer.

The thickness of each of the protective layers is, but not particularly limited to, preferably in the range of 50 to 150 μm thickness of less than 50 nm can lead to an insufficient mechanical strength. A thickness exceeding 150 nm can result in an excessively high strength, which makes pulverization and dispersion difficult. Furthermore, a thickness exceeding 150 nm can cause the detachment of the protective layers from the layer composed of the metal or metal compound.

Furthermore, as exemplified in JP-A-2005-68251, a colorant layer may be arranged between the layer composed of the metal or metal compound and a corresponding one of the protective layers.

A colorant layer is arranged so as to produce a composite pigment that gives any color. The colorant layer is not particularly limited as long as it contains a colorant that imparts any tint and any hue to the metal pigment, having the function of reflecting light and having a metallic luster and a glitter, used in this embodiment. A colorant used in the colorant layer may be either dye or pigment. A known dye or pigment may be appropriately used.

In this case, the term "pigment" used in the colorant layer includes natural pigments, synthetic organic pigments, and synthetic inorganic pigments defined in the field of general engineering.

While a method for forming the colorant layer is not particularly limited, the colorant layer is preferably formed by coating. In the case where the colorant used in the colorant layer is a pigment, preferably, the colorant layer further contains a colorant-dispersing resin. In this case, a dispersion or solution formed by dispersing or dissolving the pigment, the colorant-dispersing resin, and, as needed, additional additives in a solvent is preferably spin-coated to form a uniform liquid film, followed by drying to afford a resin thin film. In the production of the pigment composite, both of the colorant layer and the protective layers are formed by coating from the viewpoint of productivity.

The pigment composite may have a structure with a plurality of substructures each having a releasing resin layer and a layer composed of a metal or metal compound that are stacked in that order. In this case, the total thickness of the stacking structure including the plural layers composed of the metal or metal compound, i.e., a stack of the layer composed of the metal or metal compound-releasing resin layer-layer composed of the metal or metal compound, or a stack of the releasing resin layer-layer composed of the metal or metal compound, except for the base sheet and the releasing resin layer arranged directly on the base sheet, preferably has a thickness of 5000 nm or less. A thickness of 5000 nm or less does not readily result in the occurrence of cracking or detachment even when the pigment composite is rolled, thus providing excellent preservability. Furthermore, when the pigment composite is converted into the pigment, the resulting pigment is excellent in glossiness and hiding power and thus preferred. While a structure in which the releasing resin layer and the layer composed of the metal or metal compound are stacked in that order on each surface of the base sheet may also be exemplified, the structure of the pigment composite is not limited thereto.

Preferred examples of a method for detaching the composite pigment from the base sheet include, but are not particularly limited to, a method in which the pigment composite is immersed in a liquid; and a method in which sonication is performed while the pigment composite is immersed in a liquid to detach the composite pigment and pulverize the detached composite pigment.

The resulting metal pigment formed of plate-like particles is only subjected to dispersion treatment in a solvent to provide a stable dispersion because the releasing resin layer serves as a protective colloid. In the case where the metal pigment is contained in the ink composition according to this embodiment, the resin constituting the releasing resin layer also imparts adhesion to a recording medium or the spherical particles to the metal pigment.

1.2.2. Spherical Particles

The ink composition contains the spherical particles. The spherical particles have the function of refracting light when the ink composition is deposited on a recording medium. In the case where a configuration of providing the deposit having retroreflectivity has functions classified into the function of reflecting light, the function of refracting light, and the function of protecting a structure, the spherical particles mainly have the function of refracting light.

The ink composition has a spherical particle content of 0.5% to 5% by mass, preferably 0.5% to 4.5% by mass, and more preferably 0.6% to 4% by mass with respect to the total mass of the ink composition. The mass ratio of the metal pigment to the spherical particles contained in the ink composition is preferably in the range of 3:1 to 1:10. When the mass ratio of the metal pigment to the spherical particles contained in the ink composition is within the above range, a recorded product produced by the ink-jet recording method according to this embodiment has enhanced retroreflectivity.

Each of the spherical particles has a shape close to a sphere. The shape of the spherical particles can be evaluated by, for example, sphericity S expressed as an expression described below.

$$\text{Sphericity } S = \text{minimum radius of particle } r_{min}/\text{maximum radius of particle } r_{max}$$

where $r_{min}$ represents the minimum distance between the barycenter of a particle and a surface of the particle, and $r_{max}$ represents the maximum distance between the barycenter of the particle and the surface of the particle. In this case, the barycenter of the particle may be defined as the center of a sphere circumscribing the particle.

In the case where each of the spherical particles is in the form of a substantial sphere, a recorded product has retroreflectivity. The retroreflectivity of the recorded product is increased as the shape approaches a sphere. In the case where the shape of each spherical particle is expressed by sphericity S defined above, the spherical particles preferably have a sphericity S of 0.8 to 1 and more preferably 0.9 to 1.

The spherical particles are optically transparent. Here, the term "optically transparent" is used to indicate that a flat plate composed of an optically transparent material is optically transparent. Thus, in the case where light, such as ultraviolet light, visible light, or infrared light, is incident on the flat plate composed of the optically transparent material, the term "optically transparent" indicates that the flat plate has a high transmittance to light within at least one wavelength range.

For example, in the case where light incident on the flat plate composed of the optically transparent material is visible light, the term "optically transparent" indicates that the plate is clear and either colorless or colored. In this embodiment, the spherical particles may contain a light-scattering material. In this case, when light incident on the flat plate composed of the optically transparent material is visible light, the term "optically transparent" includes the fact that the plate is translucent and either colorless or colored.

The material constituting the spherical particles is not particularly limited as long as the material is optically transparent. The material is preferably one selected from colorless, transparent materials, colored, transparent materials, colorless, translucent materials, and colored, translucent materials, at least to the extent that when an object is viewed through a flat plate composed of the material, the shape of the object is recognized.

Each of the spherical particles has a size such that the ink-jet recording apparatus can eject droplets of the ink composition. In the case where each of the spherical particles is approximated by a sphere, the spherical particles may have an average particle size (diameter) of 0.5 to 6 µm, preferably 1 to 3 µm, and more preferably 1.5 to 2.5 µm.

Specific examples of the material constituting the spherical particles according to this embodiment include glass, silicone resins, acrylic resins, and styrene resins. These may be colored or uncolored. The use of a colored material imparts retroreflectivity and a color to a recorded product to be formed.

The spherical particles according to this embodiment can be produced by, for example, dispersing a precursor of a desired material in an appropriate solvent, polymerizing the precursor by suspension polymerization, emulsion polymerization, or the like, and, as needed, removing the solvent.

Examples of commercially available spherical particles according to this embodiment include Tospearl 120, 130, 145, 2000B, VC99-A8808 (trade name, manufactured by Nissho Sangyo Co., Ltd).

1.2.3. Additional Component

The ink composition may contain a colorant, a dispersant, an organic solvent, a polymerizable compound, a polymerization initiator, a surfactant, and so forth as additional components. Among these compounds, the polymerizable compound and the polymerization initiator are usually contained in combination. In the case where the ink composition contains the organic solvent, the ink composition is what is called a solvent-based ink composition. In this case, the polymerizable compound and the polymerization initiator are rarely added, and a resin component can be contained as a binder. In the case where the polymerizable compound and the polymerization initiator are contained, the ink composition is an energy-curable ink composition. In this case, an organic solvent is rarely added, and a polymerization promoter, a polymerization inhibitor, and so forth can be contained.

The additional components that can be added to the ink composition will be described below. These components may be added to the ink composition without limitation unless the additional components impair the retroreflectivity of a recorded product.

1.2.3.1. Colorant

The ink composition may contain a colorant. The colorant may be either dye or pigment. The incorporation of the colorant into the ink composition results in the formation of a colored image having retroreflectivity on a recording medium.

Examples of dye that can be used in the ink composition include various dyes commonly used in ink-jet recording, for example, direct dyes, acid dyes, food colors, basic dyes, reactive dyes, disperse dyes, vat dyes, soluble vat dyes, and reactive disperse dyes.

Examples of a pigment that can be used in the ink composition include inorganic pigments and organic pigments.

Examples of the inorganic pigments that can be used include carbon blacks produced by known processes, such as a contact process, a furnace process, and a thermal process; titanium oxide; and iron oxide. Examples of the organic pigments that can be used include azo pigments, such as azo lake pigments, insoluble azo pigments, condensed azo pigments, and chelate azo pigments; polycyclic pigments, such as phthalocyanine pigments, perylene pigments, perinone pigments, anthraquinone pigments, quinacridone pigments, dioxazine pigments, thioindigo pigments, isoindolinone pigments, and quinophthalone pigments; dye chelates, such as basic dye chelates and acid dye chelates; nitro pigments; nitroso pigments; and aniline black.

Specific examples of carbon blacks include C.I. Pigment Black 7; No. 2300, No. 900, MCF88, No. 33, No. 40, No. 45, No. 52, MA7, MA8, MA100, and No. 2200B manufactured by Mitsubishi Chemical Corporation; Raven 5750, Raven 5250, Raven 5000, Raven 3500, Raven 1255, and Raven 700 Manufactured by Columbia Co.; Regal 400R, Regal 330R, Regal 660R, Mogul L, Mogul 700, Monarch 800, Monarch 880, Monarch 900, Monarch 1000, Monarch 1100, Monarch 1300, and Monarch 1400 manufactured by Cabot Co.; and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 manufactured by Degussa Co.

Examples of a yellow pigment include C.I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, 213, and Chromophtal Yellow LA2 (manufactured by Ciba Specialty Chemicals Inc).

Examples of a magenta pigment include C.I. Pigment Red 5, 7, 12, 48 (Ca), 48 (Mn), 57 (Ca), 57:1, 112, 122, 123, 168, 184, 202, 209, C.I. Pigment Violet 19, and Hostaperm Pink E02 (manufactured by Clariant (Japan) K.K).

Examples of a cyan pigment include C.I. Pigment Blue 1, 2, 3, 15:3, 15:4, 60, 16, 22, and TGR-SD (manufactured by DIC Corporation).

The ink composition may contain a white pigment. Examples of the white pigment include pigments formed of hollow resin particles and pigments formed of metal oxide particles. The hollow resin particles are not particularly limited, and a known hollow resin particles may be used. For example, hollow resin particles disclosed in U.S. Pat. Nos. 4,880,465, 3,562,754, and so forth can be preferably used. Examples of a material constituting the metal oxide particles include titanium dioxide and zinc oxide (zinc white).

In the case where the ink composition contains a pigment, the pigment preferably has an average particle diameter of 10 to 200 nm and more preferably about 50 to about 150 nm. In the case where the ink composition contains a colorant, the ink composition preferably has a colorant content of about 0.1% to about 25% by mass and more preferably about 0.5% to about 15% by mass.

In the case where the ink composition contains the pigment, the ink composition may further contain a dispersant or a surfactant. Regarding a preferred dispersant, a dispersant commonly used for the preparation of a pigment dispersion, for example, a polymeric dispersant, may be used. An example of the dispersant is Solsperse 13940 manufactured by Lubrizol Corporation.

1.2.3.2. Organic Solvent

The ink composition may contain an organic solvent. Preferred examples of the organic solvent include polar organic solvents, such as alcohols (e.g., methanol, ethanol, propanol, butanol, isopropyl alcohol, and fluorinated alcohols); ketones (e.g., acetone, methyl ethyl ketone, and cyclohexanone); carboxylic acid esters (e.g., methyl acetate, ethyl acetate, propyl acetate, butyl acetate, methyl propionate, and ethyl propionate); and ethers (e.g., diethyl ether, dipropyl ether, tetrahydrofuran, and dioxane). Among these compounds, alkylene glycol ethers, which are each in the form of a liquid at ambient temperature and atmospheric pressure, can be preferably used.

Examples of alkylene glycol ethers include ethylene glycol-based ethers and propylene glycol-based ethers, which are based on aliphatic groups, such as methyl, n-propyl, isopropyl, n-butyl, isobutyl, hexyl, and 2-ethylhexy groups, and allyl and phenyl groups having double bonds. Each of the alkylene glycol ethers is colorless and in the form of a liquid at ambient temperature and atmospheric pressure and has only faint odors and both characteristics of alcohol and ether because of the presence of ether and hydroxy groups in its molecule. Hence, the alkylene glycol ethers are preferably used. Furthermore, alkylene glycol ethers include alkylene glycol monoethers, in which only one hydroxy group in each molecule is substituted, and alkylene glycol diethers, in which both hydroxy groups in each molecule are substituted. The different types of ethers may be used in combination.

In the case where the ink composition contains an organic solvent, it is preferable to use at least one selected from alkylene glycol monoethers, alkylene glycol diethers, and mixtures of lactones.

Examples of alkylene glycol monoethers include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Examples of lactones include γ-butyrolactone, δ-valerolactone, and ε-caprolactone.

In the case where the ink composition contains the organic solvent exemplified above, the ink composition has an organic solvent content of, for example, 50% to 99% by mass with respect to the total mass of the ink composition.

In the case where the ink composition contains the organic solvent, the ink composition may further contain a resin serving as a binder. Examples of the resin include cellulose ester resins, such as cellulose acetate (CA), cellulose acetate propionate (CAP), cellulose acetate butyrate (CAB), cellulose propionate (CP), and cellulose triacetate (CAT).

In the case where the ink composition contains the binder resin, when the ink composition is attached to a surface of a recording medium, the binder resin protects the resulting deposit from abrasion and so forth. In the case where a configuration of providing the deposit having retroreflectivity has functions classified into the function of reflecting light, the function of refracting light, and the function of protecting a structure, the binder resin mainly has the function of protecting the structure.

1.2.3.3. Polymerizable Compound

The ink composition may contain a polymerizable compound and a polymerization initiator. The polymerizable compound may have cationic polymerizability and/or radical polymerizability. The polymerization initiator serves as an initiator used for cationic polymerization and radical polymerization and is appropriately selected depending on the type of compound. The incorporation of these compounds into the ink composition improves, for example, the abrasion resistance of a deposit formed by attaching the ink composition to a recording medium. The polymerization initiator will be described below. A polymerizable compound having any structure, e.g., a monomer, an oligomer, a linear polymer, or a dendritic oligomer, may be used.

Examples of a cationically polymerizable compound that can be used for the ink composition include compounds having cationically polymerizable groups. The cationically polymerizable groups include epoxy rings, such as aromatic epoxy groups and alicyclic epoxy groups, oxetane rings, oxolane rings, dioxolane rings, vinyl ether structures, and functional groups having these structures. Regarding the epoxy rings, the aromatic epoxy groups and the alicyclic epoxy groups are preferred because of their excellent curing rates. In particular, the alicyclic epoxy groups are preferred. A polymerizable compound having a plurality of cationically polymerizable functional groups is preferred because of its reaction rate and curability.

Examples of the cationically polymerizable compound include various known cationically polymerizable compounds that undergo polymerization reaction with an initiating species (acid). Examples of the cationically polymerizable compound include epoxy compounds, vinyl ether compounds, and oxetane compounds.

Examples of epoxy compounds include monofunctional and polyfunctional aromatic epoxides and alicyclic epoxides. In particular, alicyclic epoxides are preferred because of its excellent curing rate.

Examples of vinyl ether compounds include monofunctional and polyfunctional vinyl ethers. Divinyl ether compounds and trivinyl ether compounds are preferred because of its excellent curing rate. In particular, divinyl ether compounds are preferred.

Examples of oxetane compounds include compounds having monofunctional and polyfunctional oxetane rings. Oxetane compounds described in JP-A-2001-220526, JP-A-2001-310937, and JP-A-2003-341217 are exemplified.

Regarding the compounds having oxetane rings, polyfunctional compounds are preferred. The use of such a compound facilitates maintaining the viscosity range of the ink composition easily handled and results in high adhesion of a cured ink to a recording medium. Such compounds having oxetane rings are described in detail in paragraph Nos. [0112] to [0113] of JP-A-2003-341217. Compounds described in the patent document can be preferably used in this embodiment.

Examples of a radically polymerizable compound that can be used for the ink composition include compounds having radically polymerizable functional groups. Examples of the radically polymerizable functional groups include functional groups having double bonds in their structure. Examples thereof include a (meth)acryloyl group, a (meth)acrylic group, a (meth)acrylamide group, a vinyl group, aromatic vinyl groups, an allyl group, a N-vinyl group, vinyl ester groups (e.g., groups having a vinyl acetate moiety, a vinyl propionate moiety, and the moiety of a vinyl ester of Versatic acid), allyl ester groups (e.g., a group having an allyl ester moiety), halogenated vinyl groups (e.g., groups having a vinylidene chloride moiety and a vinyl chloride moiety), groups having vinyl ether moieties (e.g., groups having a methyl vinyl ether moiety, a butyl vinyl ether moiety, a hexyl vinyl ether moiety, a methoxy vinyl ether moiety, a 2-ethylhexyl vinyl ether moiety, a methoxy ethyl vinyl ether moiety, a cyclohexyl vinyl ether moiety, and a chloroethyl vinyl ether moiety), and a vinyl cyanide group (e.g., a group having a (meth)acrylonitrile moiety). In this specification, the term "(meth)acrylate" is used to indicate one or both of "acrylate" and "methacrylate", and the term "(meth)acrylic" is used to indicate one or both of "acrylic" and "methacrylic".

Among the radically polymerizable functional groups exemplified above, functional groups having ethylenically unsaturated double bonds have high polymerizability and thus are more preferred in order to improve the curing rate and the curability of the ink composition deposited on a recording surface. Furthermore, such groups are not readily susceptible to oxygen inhibition and thus are curable at relatively low energy, which is more preferred. Examples of the functional groups having ethylenically unsaturated double bonds include vinyl and allyl groups. Furthermore, a radically polymerizable compound having a plurality of radically polymerizable functional groups is preferred because of its reaction rate and curability.

Examples of the radically polymerizable compound include various known radically polymerizable compounds that undergo polymerization reaction with an initiating species (radical). Examples of the radically polymerizable compound include (meth)acrylates, (meth)acrylamides, aromatic vinyl compounds, allyl group-containing compounds, and N-vinyl group-containing compounds. Further examples of the radically polymerizable compound include vinyl esters (e.g., vinyl acetate, vinyl propionate, and a vinyl ester of Versatic acid), allyl esters (e.g., allyl acetate), halogenated monomers (e.g., vinylidene chloride and vinyl chloride), vinyl ethers (methyl vinyl ether, butyl vinyl ether, hexyl vinyl ether, methoxy vinyl ether, 2-ethylhexyl vinyl ether, methoxy ethyl vinyl ether, cyclohexyl vinyl ether, and chloroethyl vinyl ether), vinyl cyanide (e.g., (meth)acrylonitrile), and olefins (e.g., ethylene and propylene).

Furthermore, a dendritic oligomer may be used as the radically polymerizable compound. Examples of the dendritic oligomer include oligomers prepared by polymerization of polyfunctional (meth)acrylate compounds and polyvalent mercapto compounds through the Michael addition (β-position with respect to a carbonyl group).

The dendritic oligomer preferably has an adequate number of functional groups for radical polymerization. Thus, the dendritic oligomer preferably has a molecular weight of 100 to 100,000 per mole of a carbon-carbon double bond. Furthermore, the dendritic oligomer preferably has a weight-average molecular weight of 1000 to 60,000, more preferably 1500 to 60,000, and particularly preferably 10,000 to 60,000.

A specific example of the dendritic oligomer that can be used for the ink composition is a dendritic oligomer "STAR 501" (trade name, available from Osaka Organic Chemical Industry Ltd). In the case where the ink composition contains the dendritic oligomer, the ink composition has a dendritic oligomer content of 1% to 50% by mass and more preferably 5% to 30% by mass with respect to the total mass of the ink composition.

The polymerizable compound may be used alone or in combination as a mixture in order to adjust the rate of polymerization reaction, the physical properties of ink, the physical properties of a cured film, and so forth.

Examples of the polymerizable compound that can be used for the ink composition may include a compound prepared by introducing a radically polymerizable functional group into a compound having a cationically polymerizable functional group; and a compound prepared by introducing a cationically polymerizable functional group into a compound having a radically polymerizable functional group.

In the case where the ink composition contains the polymerizable compound, the ink composition suitably has a polymerizable compound content of 50% to 99% by mass and preferably 60% to 98% by mass with respect to the total mass of the ink composition.

1.2.3.4. Polymerization Initiator

In the case where the ink composition contains the polymerizable compound, the ink composition may further contain an appropriate polymerization initiator. Examples of the polymerization initiator include a radical-polymerization initiator and a cationic-polymerization initiator, which can generate initiating species by the application of energy. The term "energy" used herein indicates heat and/or energy radiation (e.g., an electromagnetic wave, light, or corpuscular radiation).

Any initiator known to those skilled in the art can be used, without limitation, as the radical-polymerization initiator that generates a radical by the application of energy. Specifically, many initiators are described in Bruce M. Monroe et al., Chemical Review, 93, 435 (1993), R. S. Davidson, Journal of Photochemistry and biology A: Chemistry, 73.81 (1993), J. P. Faussier "Photoinitiated Polymerization-Theory and Applications": Rapra Review vol. 9, Report, Rapra Technology (1998), and M. Tsunooka et al., Prog. Polym. Sci., 21, 1 (1996). Furthermore, compounds described in, for example, F. D. Saeva, Topics in Current Chemistry, 156, 59 (1990), G. G. Maslak, Topics in Current Chemistry, 168, 1 (1993), H. B. Shuster et al., JACS 112, 6329 (1990), and I. D. F. Eaton et al., JACS 102, 3298 (1980) are known as the radical-polymerization initiator and undergo oxidative or reductive bond cleavage through interaction with a sensitizing dye in an electronically excited state.

Preferred examples of the radical polymerization initiator include (a) aromatic ketones, (b) aromatic onium salt compounds, (c) organic peroxides, (d) hexaarylbiimidazole compounds, (e) ketoxime ester compounds, (f) borate compounds, (g) azinium compounds, (h) metallocene compounds, (i) active ester compounds, (j) compounds having a carbon-halogen bond, (k) acylphosphine oxide-based compounds.

Examples of the cationic polymerization initiator include peroxides, such as benzoyl peroxide (BPO) and persulfate, azobis(isobutyronitrile) (AIBN), and isophthalic acid dihydrazide. Examples of a photocationic polymerization initiator include onium salt-based photocationic polymerization initiators, e.g., aromatic sulfonium salt-based, aromatic iodonium salt-based, aromatic diazonium salt-based, pyridium salt-based, and aromatic phosphonium salt-based photocationic polymerization initiators; and nonionic compounds, such as iron-arene complexes and sulfonates. Examples of a thermal cationic polymerization initiator include protic acids, such as sulfuric acid, perchloric acid, and trichloroacetic acid; Lewis acids, such as aluminum chloride, boron trifluoride, and ferric chloride; iodine; and other cation-generating compounds, such as triphenyl hexachloroantimonate.

In the case where the ink composition contains the polymerizable compound and the polymerization initiator, it is possible to attach the ink composition to a recording medium and then cure the ink composition by energy.

In the case where the ink composition contains the polymerizable compound and the polymerization initiator, the ink composition may further contain a radical polymerization inhibitor, thereby improving the storage stability of the ink composition. Examples of the radical polymerization inhibitor include Irgastab UV-10 and Irgastab UV-22 (manufactured by Ciba Specialty Chemicals Inc).

In the case where the ink composition contains the polymerizable compound and the polymerization initiator, the ink composition may further contain a polymerization promoter. Examples of the polymerization promoter include, but are not particularly limited to, Darocur EHA and Darocur EDB manufactured by Ciba Specialty Chemicals Inc).

In the case where the ink composition contains the polymerizable compound and the polymerization initiator, when the ink composition is attached to a surface of a recording medium, a cured product of these compounds protects the resulting deposit from abrasion and so forth. In the case where a configuration of providing the deposit having retroreflectivity has functions classified into the function of reflecting light, the function of refracting light, and the function of protecting a structure, the polymerizable compound and the polymerization initiator mainly have the function of protecting the structure.

1.2.3.5. Surfactant

The ink composition may contain a surfactant. Examples of the surfactant include silicone-based surfactants, such as polyester-modified silicones and polyether-modified silicones; polyether-modified polydimethylsiloxanes; and polyester-modified polydimethylsiloxanes.

The ink composition may contain a nonionic surfactant as an additive. The addition of the nonionic surfactant results in the ink composition having excellent penetration into a recording medium, thereby immediately fixing the ink composition on the recording medium during printing.

Examples of the nonionic surfactant include, but are not particularly limited to, acetylenic glycol-based surfactants. Examples of the acetylenic glycol-based surfactants include BYK-UV3570, BYK-UV3500, BYK-UV3510, 3530, BYK-347, and BYK-348 (manufactured by BYK Japan KK).

In the case where the ink composition contains the surfactant, the ink composition preferably has a surfactant content of 0.1% to 5% by mass and more preferably 0.2% to 2% by mass with respect to the total mass of the ink composition. A surfactant content of 0.1% by mass or more results in an increase in the penetration of the ink composition into a recording medium. A surfactant content of 5% by mass or less is less likely to cause spreading of the ink composition constituting an image on the recording medium.

1.2.3.6. Additional Additive

The ink composition may contain a known component that can be used for general ink. Examples of the component include a humectant, a penetrant, a pH adjuster, a preservative, and a fungicide. The ink composition may further contain, as needed, a leveling additive, a matte agent, and a resin, for example, a polyester resin, a polyurethane resin, a vinyl resin, an acrylic resin, a rubber resin, or wax, which is used to adjust the physical properties of a film to be formed.

The ink composition may further contain an antioxidant, an ultraviolet absorber, and so forth. Examples of the antioxidant include 2,3-butyl-4-hydroxyanisole (BHA) and 2,6-di-tert-butyl-p-cresol (BHT). Examples of the ultraviolet absorber include benzophenone-based compounds and benzotriazole-based compounds.

1.2.4. Method for Preparing Ink Composition

An example of a method for preparing an ink composition according to this embodiment includes, but is not limited to, sufficiently mixing components contained in an ink composition to dissolve the components as uniform as possible, pressure-filtering the resulting mixture through a membrane filter having a pore size of 5 μm, and as needed, degassing the resulting solution with a vacuum pump.

1.2.5. Physical Property of Ink Composition

The ink composition according to this embodiment is an ink composition used for an ink-jet recording apparatus utilizing ink-jet recording. Thus, the ink composition preferably has a viscosity of 1 to 20 mPa·s, more preferably 2 to 15 mPa·s, and still more preferably 3 to 12 mPa·s at 20° C. The ink composition having a viscosity within the range described above is more suitably used in the ink-jet recording apparatus. In other words, an appropriate amount of the composition is ejected from a nozzle, so that the deflection and the scattering of flying droplets of the ink composition can be further reduced. The use of the ink composition having a viscosity within the range described above ensures the ejection stability of the ink composition in a step of ejecting the ink composition to attach the ink composition to a surface of a recording medium with the ink-jet recording apparatus. The viscosity of the ink composition can be adjusted by changing the amounts of the components.

1.3. Recording Medium

A recording medium for use in the ink-jet recording method according to this embodiment has a recording surface with an average surface roughness Ra of 3 μm or more.

Examples of the recording medium include absorptive recording media, such as paper, film, and cloth media; and nonabsorptive recording media, such as metal, glass, and plastic media. The absorptive or nonabsorptive recording medium is selected depending on the components in the ink composition described above. The recording medium may be colorless and transparent, translucent, colored and transparent, chromatic-colored and opaque, achromatic-colored and opaque, or the like.

The average surface roughness Ra of the recording surface of the recording medium can be measured with, for example, a common surface roughness measurement device.

The recording medium is not particularly limited as long as the recording surface has an average surface roughness Ra of 3 μm or more. Examples of a commercial item of such a recording medium include SPVCB-1270 (trade name, Ra=5.058 μm, manufactured by Roland DG Corporation) and MACtac JT5828T (trade name, Ra=3.48 μm, manufactured by MACtac).

The ink-jet recording method according to this embodiment is performed with the ink-jet recording apparatus. It is thus possible to significantly simply and rapidly form an image having retroreflectivity on the recording medium.

2. RECORDED PRODUCT

A recorded product according to this embodiment is a product in which an image is recorded by the ink-jet recording method on the recording medium having a recording surface with an average surface roughness Ra of 3 μm or more. In the recorded product according to this embodiment, the formed image has retroreflectivity. Such a recorded product has high visibility.

Retroreflection means a phenomenon in which when light is incident on an image, reflected light returns in the direction of the incident light. The retroreflectivity of an image means the retroreflective ability of the image. The retroreflectivity of an image can be evaluated by, for example, Japan Industrial Standard (JIS) Z8714 "Retroreflectors-Optical properties-Measuring method". Alternatively, the retroreflectivity of an image can be evaluated by another simplified method. For example, the retroreflectivity can be evaluated by a method in which light emitted from a light source is incident on a measurement point with a goniophotometer at a specific incident angle to an image and then light reflected from the measurement point is detected with a detector movable on the circumference of a circle with a center located at the measurement point. In this case, the detector is scanned in a plane including the axis of the incident light and perpendicular to the image.

Retroreflected light propagates toward a light source, i.e., in the direction of the incident light. Thus, in the case where the measurement is performed with a goniophotometer, the retroreflected light cannot be directly evaluated because of the same angular position of the detector and the light source. However, tails the intensity curve of the retroreflected light can be measured at positions such that detection angles are slightly different from an incident angle. Thus, the resulting intensities are extrapolated or averaged to evaluate the retroreflective component of the incident light. In the case of using the goniophotometer, a regularly reflected component of the incident light, i.e., the intensity of light reflected at a reflection angle, can be simultaneously measured. The intensity of light detected with the detector can be digitized in terms of, for example, the Y component, as lightness, in the XYZ color system.

An image of the recorded product according to this embodiment has retroreflectivity. In the case where the image has a retroreflective index Rr of 0.015 (1.5%) or more, visibility is more satisfactory. The retroreflective index Rr is represented by expression (1) described below.

$$Rr = Yr/Ys \quad (1)$$

where Yr and Ys represent the lightnesses of a retroreflective component and a regular reflection component, respectively, of reflected light when light is incident on the image at an incident angle of 45°.

Here, an incident angle of 45° indicates that when a direction perpendicular to the recording surface is defined as 0°, the angle formed by the direction and the axis of the incident light is 45°. Furthermore, the reflected light used here indicates the whole of the light reflected from the recording surface. The "lightness (Yr) of the retroreflective component" indicates, with respect to retroreflected light reflected within an angle range of 45°±10°, i.e., 35° to 55°, the average of lightnesses of retroreflected light measured at detection angles of 35° and 55°. The "lightness (Ys) of the regular reflection component" indicates the lightness of the reflected light measured at a detection angle of −45°.

3. INK SET

An example of an ink set according to this embodiment is an ink set including at least one ink composition described in section "1.2. Ink Composition".

A single or plurality of the ink compositions may be included in the ink set. The ink set may further include a single or plurality of inks containing other ink compositions. Examples of other ink compositions include color ink compositions, such as cyan, magenta, yellow, light cyan, light magenta, dark yellow, red, green, blue, orange, and violet ink compositions, black ink compositions, and light black ink compositions.

4. INK CARTRIDGE AND INK-JET RECORDING APPARATUS

An example of an ink cartridge according to this embodiment is an ink cartridge including the ink set described above. The use of the ink cartridge facilitates the transfer of the ink set including the ink composition. An ink-jet recording apparatus according to this embodiment includes the ink composition, the ink set, or the ink cartridge. An example thereof is the ink-jet recording apparatus described in section "1.1. Ink-Jet Recording Apparatus".

5. EXAMPLES AND COMPARATIVE EXAMPLES

While the invention will be described in detail below by examples and comparative examples, the invention is not limited thereto.

5.1. Ink Composition 5.1.1. Preparation of Metal Pigment Dispersion

A resin-layer coating (10% by weight of CAB resin (butylation rate: 50% to 54%, molecular weight: 16,000) in diethylene glycol diethyl ether) was uniformly applied on a 100-μm-thick PET film by bar coating and then dried at 60° C. for 10 minutes, forming a thin resin layer on the PET film.

An aluminum layer having an average thickness of 20 nm was formed on the thin resin layer with a vacuum evaporator (Model VE-1010, manufactured by Vacuum Device Inc). The aluminum layer having the thickness had an ultraviolet radiation transmittance of 8% at a wavelength of 365 nm and 0.8% at 395 nm.

The resulting laminate was immersed in ethylene glycol monoallyl ether. The aluminum layer was detached from the PET film with an ultrasonic disperser (Model VS-150, manufactured by As One Corporation). Furthermore, several PET films including aluminum layers were similarly immersed, and then the aluminum layers were detached. The dispersion was concentrated. The detached aluminum layers were pulverized during the concentration while the intensity of ultrasound was adjusted. At this time, the pulverized aluminum layers were dispersed in the solvent. The ultrasound treatment was performed for 12 hours, thereby preparing a metal pigment dispersion.

The resulting metal pigment dispersion was filtered through a stainless-steel mesh filter with 5-μm openings to remove coarse particles. The resulting filtrate was charged into a round-bottom flask. Excessive amounts of ethylene glycol monoallyl ether were removed by evaporation with a rotary evaporator, concentrating the metal pigment dispersion. The concentration of the metal pigment was determined with a thermal analyzer (EXSTAR-6000 TG/DTA, manufactured by SII NanoTechnology Inc). The concentration of the metal pigment was then adjusted, thereby preparing a metal pigment dispersion having a metal pigment content of 5% by mass.

A 50%-average particle diameter R50 in terms of circle-equivalent diameters determined by areas of X-Y planes of the metal pigment was measured with a particle-diameter and particle-distribution analyzer (FPIA-3000S, manufactured by Sysmex Corporation), in which X represents a major axis, and Y represents a minor axis. The thickness Z was measured, and then R50/Z was calculated. As a result, the metal pigment had an R50 of 1.03 μm and an R50/Z of 51.5.

5.1.2. Preparation of Ink Composition

Diethylene glycol diethyl ether (manufactured by Nippon Nyukazai Co., Ltd.), γ-butyrolactone (manufactured by Kanto Chemical Co., Inc.), tetraethylene glycol dimethyl ether (manufactured by Nippon Nyukazai Co., Ltd.), which serve as organic solvents, and spherical particles (trade name: Tospearl 120 with an average diameter of 2 μm, manufactured by Nissho Sangyo Co., Ltd.) were added to the resulting metal pigment dispersion in such a manner that compositions shown in Table 1 were satisfied. The mixtures were sufficiently stirred, thereby preparing ink compositions. The ink compositions were numbered from 1 to 10 and shown in Table 1.

TABLE 1

|  |  | Ink composition | | | | | | | | | |
|---|---|---|---|---|---|---|---|---|---|---|---|
|  |  | 1 | 2 | 3 | 4 | 5 | 6 | 7 | 8 | 9 | 10 |
|  | Metal content | 1.5 | 1.5 | 1.5 | 1.5 | 1.5 | 1.5 | 1.5 | 1.5 | 1.5 | 1.5 |
|  | Spherical particles | 2.0 | 3.0 | 5.0 | 0.5 | 0.75 | 1.0 | 1.5 | — | 0.1 | 0.2 |
| Organic solvent | Diethylene glycol diethyl ether | 63.5 | 62.5 | 60.5 | 65.0 | 64.75 | 64.5 | 64.0 | 65.5 | 65.4 | 65.3 |
|  | γ-Butyrolactone | 15.0 | 15.0 | 15.0 | 15.0 | 15.0 | 15.0 | 15.0 | 15.0 | 15.0 | 15.0 |
|  | Tetraethylene glycol dimethyl ether | 18.0 | 18.0 | 18.0 | 18.0 | 18.0 | 18.0 | 18.0 | 18.0 | 18.0 | 18.0 |

Unit: percent by mass 5.2. Recording Medium

Average surface roughnesses Ra of recording media used in examples and comparative examples were shown in Table 2. Table 2 also shows the recording media numbered from 1 to 4. MACtac JT5828T was purchased from MACtac. SPVCB-1270, SPVC-G-1270T, and SV-G-610G were purchased from Roland DG Corporation.

TABLE 2

| Recording medium | Trade name | Average surface roughness Ra (μm) |
|---|---|---|
| 1 | MACtac JT5828 | 3.480 |
| 2 | SPVCB-1270 | 5.058 |
| 3 | SPVC-G-1270T | 0.760 |
| 4 | SV-G-610G | 0.900 |

5.3. Evaluation Sample and Evaluation

Evaluation samples according to examples and comparative examples were prepared as described below.

Each of the ink compositions was installed in a matte black column of an ink-jet printer (Model PX-G5100, manufactured by Seiko Epson Corporation). The ink compositions were applied to the recording media by printing. A solid pattern with a size of 10 cm×10 cm was formed by printing. The amount of each ink composition used was 0.9 mg/cm².

Measurement was performed with a goniophotometer, and then the retroreflective indices Rr of printed portions were calculated according to expression (1) described below.

$$Rr = Yr/Ys \quad (1)$$

where Yr and Ys represent the lightnesses of a retroreflective component and a regular reflection component, respectively, of reflected light when light is incident on the image at an incident angle of 45°.

The lightness (Yr) of the retroreflective component indicates the average of lightnesses of retroreflected light measured with a detector at detection angles of 35° and 55°. The lightness (Ys) of the regular reflection component indicates the lightness of the reflected light measured with the detector at a detection angle of −45°.

A goniophotometer (Model GC-5000, manufactured by Nippon Denshoku Industries Co., Ltd) was used as the goniophotometer. The resulting retroreflective indices Rr in all examples and comparative examples were also shown in Table 3.

TABLE 3

| | Example | | | | | | | |
|---|---|---|---|---|---|---|---|---|
| | 1 | 2 | 3 | 4 | 5 | 6 | 7 | 8 |

TABLE 3-continued

| | | | | | | | |
|---|---|---|---|---|---|---|---|
| Ink composition No. | 1 | 1 | 2 | 3 | 4 | 5 | 6 | 7 |
| Recording medium No. | 1 | 2 | 1 | 1 | 1 | 1 | 1 | 1 |
| Retroreflective index (%) | 5 | 1.8 | 6.4 | 12.7 | 1.6 | 2.2 | 2.6 | 3.4 |

| | Comparative Example | | | | | | | | | |
|---|---|---|---|---|---|---|---|---|---|---|
| | 1 | 2 | 3 | 4 | 5 | 6 | 7 | 8 | 9 | 10 |
| Ink composition No. | 1 | 2 | 3 | 4 | 5 | 6 | 7 | 1 | 2 | 3 |
| Recording medium No. | 3 | 3 | 3 | 3 | 3 | 3 | 3 | 4 | 4 | 4 |
| Retroreflective index (%) | 0.1 | 0.2 | 0.5 | 0 | 0 | 0 | 0 | 0.1 | 0.2 | 0.5 |

| | Comparative Example | | | | | | | | |
|---|---|---|---|---|---|---|---|---|---|
| | 11 | 12 | 13 | 14 | 15 | 16 | 17 | 18 | 19 |
| Ink composition No. | 8 | 9 | 10 | 8 | 8 | 9 | 9 | 10 | 10 |
| Recording medium No. | 1 | 1 | 1 | 3 | 4 | 3 | 4 | 3 | 4 |
| Retroreflective index (%) | 0.7 | 0.8 | 0.9 | 0 | 0 | 0 | 0 | 0 | 0 |

FIGURE shows, as a measurement example using the goniophotometer, the measurement results of the reflectivities of samples in Example 4 and Comparative Examples 3 and 10. In the graph of FIGURE, the lightnesses (vertical axis) were plotted against different positions (angles (horizontal axis)) of the detector when light from a light source of the goniophotometer was incident on the samples at an incident angle of 45°. As described above, the lightness was not measured when the detector was located in the vicinity of the light source (45°).

FIGURE shows that in the sample according to Example 4, the lightness is increased at an angle close to 45° (near the light source). This demonstrates that the sample according to Example 4 has retroreflectivity. In contrast, in the samples according to Comparative Examples 3 and 10, substantially no increase in lightness is observed at an angle close to 45° (near the light source). This demonstrates that each of the samples according to Comparative Examples 3 and 10 has little reflectivity.

5.4. Evaluation Result

As shown in Table 3, each of the samples according to Examples 1 to 8, in which ink compositions 1 to 7 each having an optically transparent spherical particle content of 0.5% to 5% by mass were applied by printing to recording media 1 and 2 each having an average surface roughness Ra of 3 µm or more, had a retroreflective index Rr of 1.6% or more.

In contrast, in the samples according to Comparative Examples 1 to 10, although ink compositions 1 to 7 each having an optically transparent spherical particle content of 0.5% to 5% by mass were used, each ink composition was applied to recording medium 3 or 4 having an average surface roughness Ra of less than 3 µm, so that sufficient retroreflectivity was not provided. In the samples according to Comparative Examples 11 to 13, although printing was performed on recording medium 1 having an average surface roughness Ra of 3 µm or more, ink compositions 8 to 10 each having a spherical particle content of less than 0.5% by mass or having no spherical particle were used, so that retroreflectivity was not provided. In the samples according to Comparative Examples 14 to 19, ink compositions 8 to 10 each having a spherical particle content of less than 0.5% by mass or having no spherical particle were each applied to recording medium 3 or 4 having an average surface roughness Ra of less than 3 µm, so that retroreflectivity was not provided.

The results of Examples and Comparative Examples demonstrated that the images each having retroreflectivity were easily formed on the recording media by the ink-jet recording method according to the invention. Furthermore, the results demonstrated that the ink compositions for use in ink-jet recording according to the invention were used to form the images each having retroreflectivity on the recording media and that the ink compositions were preferably used in the ink-jet recording method.

The invention is not limited to the foregoing embodiments. Various changes can be made. For example, the invention includes configurations substantially the same as those described in the embodiments (for example, a configuration with the same function, method, and result, or a configuration with the same object and effect). The invention also includes configurations in which portions not essential in the configurations described in the embodiments are replaced with others. The invention includes configurations that achieve the same functions and effects or achieve the same objects of those of the compositions described in the embodiments. Furthermore, the invention includes configurations in which known techniques are added to the configurations described in the embodiments.

What is claimed is:

1. An ink-jet recording method comprising:
    ejecting a droplet of an ink composition containing a metal pigment and optically transparent spherical particles with an ink-jet recording apparatus, the ink composition having an optically transparent spherical particle content; and
    attaching the droplet to a recording surface of a recording medium having an average surface roughness Ra of 3 µm or more, thereby recording an image, wherein the optically transparent spherical particle content and a mass ratio of the metal pigment to spherical particles are such that the recorded image has a retroreflective index Rr of 1.5% or more,
    wherein the retroreflective index Rr is expressed as expression (1):

$$Rr = Yr/Ys \quad (1)$$

wherein Yr and Ys represent the lightnesses of a retroreflective component and a regular reflection component, respectively, of reflected light when light is incident on the image at an incident angle of 45°.

2. The method according to claim 1, wherein the spherical particles have an average diameter of 1 to 3 µm.

3. The method according to claim 1, wherein the ink composition further contains an organic solvent.

4. The method according to claim 1, wherein the mass ratio of the metal pigment to the spherical particles is in the range of 3:1 to 1:10.

5. The method according to claim 1, wherein the ink composition further contains a colorant.

6. The method according to claim 1, wherein the metal pigment is composed of aluminum or an aluminum alloy.

7. The method according to claim 1,
    wherein the metal pigment is formed of plate-like particles,
    a 50%-average particle diameter R50 in terms of circle-equivalent diameters determined from areas of X-Y planes of the plate-like particles is in the range of 0.5 to 3 µm, and
    R50/Z>5 is satisfied,
    wherein X represents a major axis on a plane of each of the plate-like particles, Y represents a minor axis on the plane, and Z represents the thickness of the plate-like particles.

8. The method according to claim 1, wherein the ink composition has a metal pigment content of 0.5% to 3% by mass.

9. A recorded product comprising:
    the image on the recording medium recorded by the ink-jet recording method according to claim 1.

10. An ink composition comprising:
    a metal pigment; and
    optically transparent spherical particles,
    wherein the metal pigment is formed of plate-like particles,
    a 50%-average particle diameter R50 in terms of circle-equivalent diameters determined from areas of the X-Y planes of the plate-like particles is in the range of 0.5 to 3 µm, and
    R50/Z>5 is satisfied,
    wherein X represents a major axis on a plane of each of the plate-like particles, Y represents a minor axis on the plane, and Z represents the thickness of the plate-like particles,
    wherein the ink composition has a spherical particle content and a mass ratio of the metal pigment to the spherical particles that are such that an image formed by ejecting droplets of the ink composition onto a recording surface of a recording medium having an average surface roughness Ra of 3 µm or more has a retroreflective index Rr of 1.5% or more,
    wherein the retroreflective index Rr is expressed as expression (1):

$$Rr = Yr/Ys \quad (1)$$

wherein Yr and Ys represent the lightnesses of a retroreflective component and a regular reflection component, respectively, of reflected light when light is incident on the image at an incident angle of 45°, and
    wherein the spherical particles have an average diameter of 1 to 3 µm.

11. The ink composition according to claim 10, wherein the mass ratio of the metal pigment to the spherical particles contained is in the range of 3:1 to 1:10.

12. The ink composition according to claim 10, further comprising:
    an organic solvent.

13. The ink composition according to claim 10, further comprising:

a colorant.

14. The ink composition according to claim 10, wherein the metal pigment is composed of aluminum or an aluminum alloy.

15. The ink composition according to claim 10, wherein the ink composition has a metal pigment content of 0.5% to 3% by mass.

16. The ink composition according to claim 10, wherein the ink composition has a viscosity of 2 to 15 mPa·s at 20° C.

17. An ink set comprising:
the ink composition according to claim 10.

18. An ink cartridge comprising:
the ink set according to claim 17.

19. An ink-jet recording apparatus comprising:
the ink composition according to claim 10.

20. The method according to claim 1, wherein the optically transparent spherical particle content is 0.5% to 5% by mass.

21. The method according to claim 10, wherein the spherical particle content is 0.5% to 5% by mass.

* * * * *